US011906469B2

(12) United States Patent
Safai

(10) Patent No.: US 11,906,469 B2
(45) Date of Patent: *Feb. 20, 2024

(54) PULSE STRETCHING TECHNIQUE FOR LASER BOND INSPECTION, LASER ULTRASONIC INSPECTION, AND LASER PEENING

(71) Applicant: The Boeing Company, Chicago, IL (US)

(72) Inventor: Morteza Safai, Newcastle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,555

(22) Filed: Oct. 29, 2021

(65) Prior Publication Data

US 2022/0052501 A1 Feb. 17, 2022

Related U.S. Application Data

(63) Continuation of application No. 16/102,551, filed on Aug. 13, 2018, now Pat. No. 11,189,982.

(51) Int. Cl.
*G01N 29/24* (2006.01)
*G01N 29/04* (2006.01)
(Continued)

(52) U.S. Cl.
CPC ......... *G01N 29/2418* (2013.01); *G01N 29/04* (2013.01); *H01S 3/0057* (2013.01); *H01S 3/225* (2013.01)

(58) Field of Classification Search
CPC .......... H01S 3/0057; H01S 3/11; H01S 3/225; H01S 3/0014; H01S 3/10; G01N 29/04;
(Continued)

(56) References Cited

U.S. PATENT DOCUMENTS 5,585,921 A 12/1996 Pepper et al.
7,583,425 B1 * 9/2009 Williams ............... G02B 26/06
382/280

(Continued)

FOREIGN PATENT DOCUMENTS

CN 106688151 5/2017
CN 106936062 A 7/2017
EP 2 541 241 A1 1/2013

OTHER PUBLICATIONS

Non-Final Office Action for U.S. Appl. No. 16/102,551, dated May 26, 2021, 16 pages.

(Continued)

*Primary Examiner* — Marrit Eyassu
(74) *Attorney, Agent, or Firm* — McDonnell Boehnen Hulbert & Berghoff LLP

(57) ABSTRACT

An example laser system includes a laser, a plurality of pulse stretchers coupled together in series, a feedback module, and a lens assembly. The plurality of pulse stretchers is configured to stretch pulse widths of laser pulses provided by the laser and to output stretched laser pulses. The feedback module includes a pulse delay comparator that is configured to compare a first laser pulse of the laser pulses to a corresponding first stretched laser pulse of the stretched laser pulses. The feedback module also includes a computing device that is configured to determine, based on a result of the comparing by the pulse delay comparator, an adjustment to a pulse stretcher of the plurality of pulse stretchers, and apply the adjustment to the pulse stretcher so as to modify a shape of a second stretched laser pulse of the stretched laser pulses.

20 Claims, 9 Drawing Sheets

(51) Int. Cl.
H01S 3/00 (2006.01)
H01S 3/225 (2006.01)

(58) Field of Classification Search
CPC .............. G01N 29/2418; G01N 29/225; G01N 2291/0231; G01N 2291/0258; G01N 21/01
USPC .......................................................... 73/588
See application file for complete search history.

(56) References Cited

U.S. PATENT DOCUMENTS

| | | | | |
|---|---|---|---|---|
| 7,770,454 | B2* | 8/2010 | Sokol | G01N 29/2412 |
| | | | | 73/842 |
| 7,813,406 | B1* | 10/2010 | Nguyen | B23K 26/0622 |
| | | | | 356/303 |
| 9,857,583 | B2 | 1/2018 | Safai et al. | |
| 10,365,251 | B2* | 7/2019 | Yamamoto | H01S 3/094076 |
| 2003/0033882 | A1* | 2/2003 | Dubois | G01N 29/341 |
| | | | | 73/579 |
| 2007/0157730 | A1 | 7/2007 | Ochiai et al. | |
| 2009/0122825 | A1* | 5/2009 | Ershov | H01S 3/10092 |
| | | | | 372/57 |
| 2013/0148185 | A1* | 6/2013 | Michaloski | B23K 26/067 |
| | | | | 359/238 |
| 2013/0148207 | A1* | 6/2013 | Michaloski | G02B 17/0652 |
| | | | | 359/629 |
| 2015/0122046 | A1* | 5/2015 | Sokol | G01N 29/2418 |
| | | | | 73/800 |
| 2016/0035603 | A1* | 2/2016 | Ikenoue | B23K 26/354 |
| | | | | 219/121.65 |
| 2016/0054216 | A1 | 2/2016 | Sokol et al. | |
| 2016/0126690 | A1* | 5/2016 | Li | H01S 3/0057 |
| | | | | 372/25 |
| 2017/0146791 | A1* | 5/2017 | Safai | G02B 26/0833 |
| 2020/0052454 | A1 | 2/2020 | Safai | |

OTHER PUBLICATIONS

Wang et al., Pulse stretcher with two beamsplitting elements for excimer laser pulses, Review of Scientific Instructions 88, 123113 (2017), 7 pages.

Extended European Search Report prepared by the European Patent Office in application No. EP 19 19 0413, dated Nov. 22, 2019.

Laser Bond Inspection: NDI for Adhesive Bond Strength Test, LSP Technologies, Inc. (2018), available at https://www.isptechnologies.com/brochures/Laser%20Bond%20Inspection%20-%20LSP%20Technologies,%20Inc.pdf.

First Notification of Office Action issued by Chinese Patent Office in application No. 201910739207.3 dated Sep. 12, 2023.

* cited by examiner

PULSE STRETCHING TECHNIQUE FOR LASER BOND INSPECTION, LASER ULTRASONIC INSPECTION, AND LASER PEENING

CROSS-REFERENCE TO RELATED APPLICATIONS

The present application is a continuation of U.S. patent application Ser. No. 16/102,551, filed Aug. 13, 2018, the entire contents of which are hereby incorporated by reference.

FIELD

The present disclosure relates generally to non-destructive testing, and more particularly, to systems and methods for non-destructive testing using lasers.

BACKGROUND

Various non-destructive testing systems use lasers. By way of example, laser bond inspection systems use lasers to evaluate the bond strength of adhesive bonds in composite structures. To evaluate the bond strength of an adhesive bond within a composite structure, an absorbing overlay and a transparent overlay can be provided on the composite structure. The laser bond inspection system can then cause a laser to emit a pulse that passes through the transparent overlay and is absorbed by the absorbing overlay. The absorption by the absorbing layer exerts pressure on the composite structure, thereby driving a stress wave into the composite structure. The laser bond inspection system can control the strength of the pulse such that the stress wave will cause the adhesive bond to fail if the bond is weak, but will have no effect on the adhesive bond if the adhesive bond is sufficiently strong. If the stress wave causes the adhesive bond to fail, the failure can be detected by a sensor positioned on the surface of the composite structure.

Laser ultrasonic inspection systems also use lasers. More specifically, laser ultrasonic inspection systems use lasers to detect defects, such as delaminations, inclusions, voids, or disbonds, in structures. For example, a laser ultrasonic inspection system can cause a laser to emit pulses that contact a surface of a structure, thereby generating ultrasonic waves. The ultrasonic waves can then interact with features on an interior of the structure, and propagate to the surface of the structure. A detector of the laser ultrasonic inspection system can then measure the ultrasonic waves, and the laser ultrasonic inspection system can analyze the measured ultrasonic waves to determine one or more characteristics of the structure.

SUMMARY

In one example, a laser system is described. The laser system includes a laser, a plurality of pulse stretchers coupled together in series, a feedback module, and a lens assembly. The laser is configured to provide laser pulses. The plurality of pulse stretchers is configured to stretch pulse widths of the laser pulses and output stretched laser pulses. The feedback module includes a pulse delay comparator and a computing device. The pulse delay comparator is configured to compare a first laser pulse of the laser pulses to a corresponding first stretched laser pulse of the stretched laser pulses. The computing device is configured to (i) determine, based on a result of the comparing by the pulse delay comparator, an adjustment to a pulse stretcher of the plurality of pulse stretchers, and (ii) apply the adjustment to the pulse stretcher so as to modify a shape of a second stretched laser pulse of the stretched laser pulses. The lens assembly is configured to output the second stretched laser pulse.

In another example, an inspection system is described. The inspection system includes a laser system and a detector. The laser system includes a laser, a plurality of pulse stretchers coupled together in series, a feedback module, and a lens assembly. The laser is configured to provide laser pulses. The plurality of pulse stretchers is configured to stretch pulse widths of the laser pulses and output stretched laser pulses. The feedback module is configured to adjust a parameter of at least one pulse stretcher of the plurality of pulse stretchers based on a comparison of a first laser pulse of the laser pulses and a corresponding first stretched laser pulse of the stretched laser pulses. The lens assembly is configured to direct a second stretched laser pulse of the stretched laser pulses to a workpiece after the feedback module adjusts the parameter of the at least one pulse stretcher. The detector is configured to detect a response of the workpiece to the second stretched laser pulse.

In another example, a method for inspecting a workpiece bondline is described. The method includes stretching a pulse width of a first laser pulse using a plurality of pulse stretchers coupled in series so as to obtain a first stretched laser pulse. The method also includes comparing the first laser pulse and the first stretched laser pulse. In addition, the method includes adjusting a parameter of at least one pulse stretcher of the plurality of pulse stretchers based on a result of the comparing of the first laser pulse and the first stretched laser pulse. Further, the method includes, after adjusting the parameter, stretching a pulse width of a second laser pulse using the plurality of pulse stretchers so as to obtain a second stretched laser pulse. Still further, the method includes delivering the second stretched laser pulse to the workpiece bondline. Still further, the method includes detecting a response of the workpiece bondline to the second stretched laser pulse.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
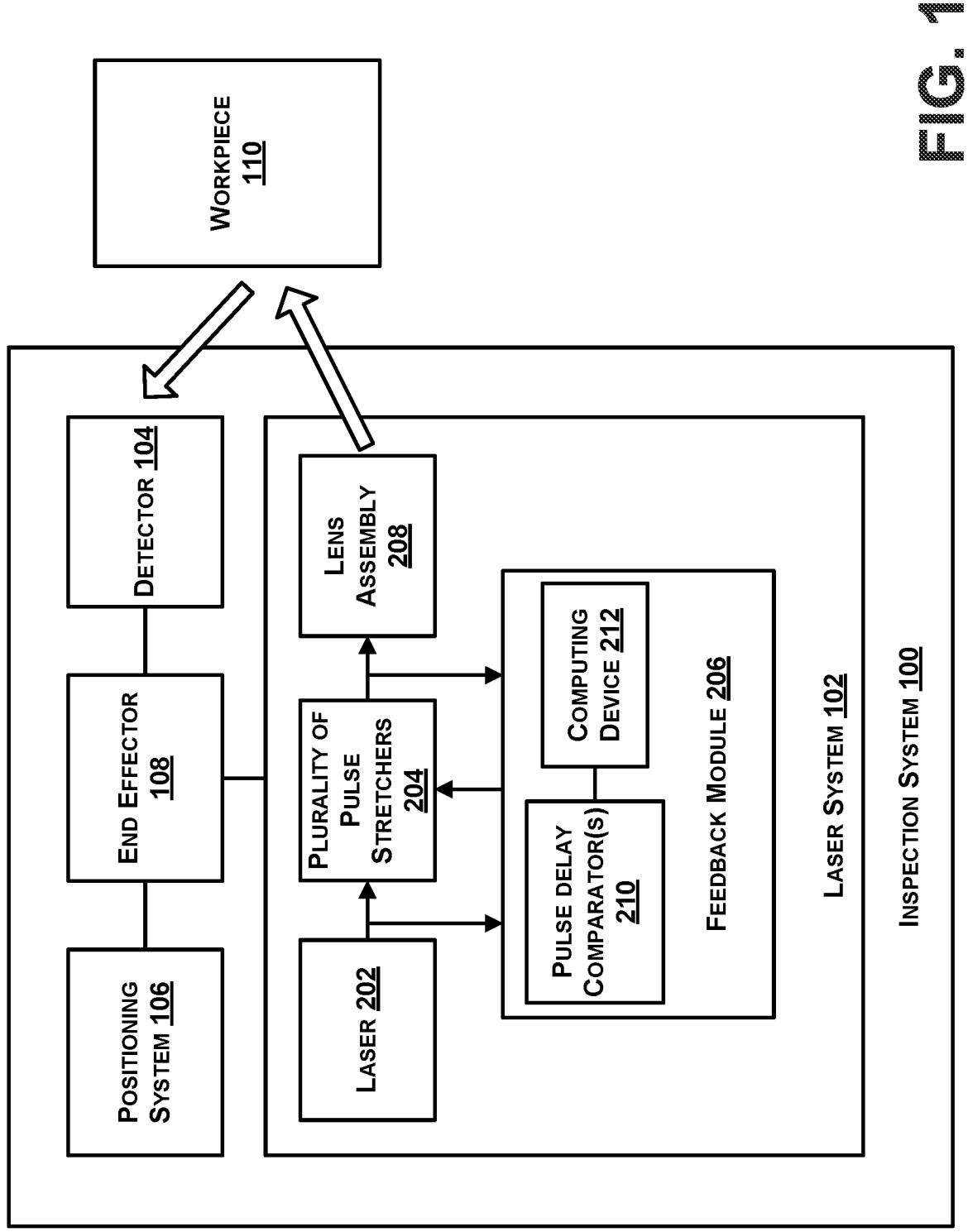
FIG. 1 illustrates an inspection system, according to an example.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are laser systems as well as systems and methods for using laser systems to inspect a structure or perform other tasks. An example laser system includes a laser configured to provide laser pulses, and a plurality of pulse stretchers coupled together in series. The plurality of pulse stretchers is configured to stretch pulse widths of the laser pulses and output stretched laser pulses. For instance, a first pulse stretcher of the plurality of pulse stretchers can receive a laser pulse output by the laser, and output a stretched laser pulse that has a longer pulse width then the received laser pulse. A second pulse stretcher of the plurality of pulse stretchers can then receive and further stretch the stretched laser pulse. This process can be repeated by each additional pulse stretcher in the plurality of pulse stretchers, until a final pulse stretcher of the plurality of pulse stretchers outputs a stretched laser pulse. The stretched laser pulse output by the plurality of pulse stretchers can then be directed toward a surface of a structure by way of a lens assembly.

The laser system can also include a feedback module configured to control a shape of the stretched laser pulse output by the plurality of pulse stretchers. The feedback module can include a pulse delay comparator and a computing device. The pulse delay comparator can be configured to compare a first laser pulse of the laser pulses to a corresponding first stretched laser pulse that has been stretched by the plurality of pulse stretchers. The computing device can also be configured to determine, based on a result of the comparing by the pulse delay comparator, an adjustment to a pulse stretcher of the plurality of pulse stretchers, and apply the adjustment to the pulse stretcher.

For instance, the pulse delay comparator can be configured to compare a trailing edge of the first laser pulse and a trailing edge of the first stretched laser pulse, and the adjustment could include an adjustment to a time delay introduced by the pulse stretcher. For instance, if the trailing edge of the first laser pulse and the trailing edge of the first stretched laser pulse are separated in time by more than a threshold difference, the adjustment could be an increase to the time delay introduced by the pulse stretcher. After adjusting the pulse stretcher, the laser can output a subsequent laser pulse and the plurality of pulse stretchers can output a subsequent stretched laser pulse, with the shape of the subsequent stretched laser pulse being different from the shape of the first stretched laser pulse.

Furthermore, the computing device can iteratively compare unstretched and stretched laser pulses and make adjustments to pulse stretchers in order to achieve an objective pulse shape. For instance, the computing device can make adjustments to respective time delays introduced by the pulse stretchers until the stretched laser pulse is uniform, square-shaped, and/or has a desired pulse width.

The laser systems disclosed herein can generate laser pulses having the desired characteristics for laser bond inspection: pulse widths on the order of 100 nanoseconds and pulse energies of 5 to 15 Joules. Conventional laser bond inspection systems generate laser pulses having these characteristics by routing a laser beam all over a large machine (e.g., a machine that is the size of a small truck) and through a complex system of optical cavities and amplifiers. As a result, the size and cost of laser bond inspection systems is prohibitive for widespread application of laser bond inspection. By using the laser systems disclosed herein as the laser source for a laser bond inspection system, less complex, smaller, and more cost-effective laser bond inspection systems can be made, thereby facilitating wider use of laser bond inspection technology. The presence of the pulse stretchers allows the system to operate with a laser that provides laser pulses with relatively short pulse widths (e.g., a few nanoseconds, ten nanoseconds, twenty nanoseconds, etc.). Such a laser can have a smaller size and be made more cost-effectively than lasers that provide pulses with longer pulse widths.

The laser systems disclosed herein can also be used in other systems. For instance, the laser systems disclosed herein can be used in laser ultrasonic inspection systems and laser peening systems.

Various other features of these systems and methods are described hereinafter with reference to the accompanying figures.

Referring now to FIG. 1, FIG. 1 illustrates an inspection system 100, according to an example. As shown in FIG. 1, inspection system 100 includes a laser system 102, a detector 104, a positioning system 106, and an end effector 108. Laser system 102 and/or detector 104 can be coupled to or positioned within end effector 108. Laser system 102 and detector 104 can also be in wired or wireless communication with each other by way of one or more communication links or in wired or wireless communication with a central computing device. Laser system 102, detector 104, positioning system 106, and end effector 108 can be components of a common apparatus. The apparatus may be a portable apparatus.

Laser system 102 can be configured to output laser pulses to a workpiece 110. Workpiece 110 can include a composite structure that is joined using adhesive bonds. One example of a workpiece is an aerospace composite structure such as an aircraft wing or an aircraft body.

In line with the discussion above, laser system 102 can include various components that can be configured for controlling characteristics of the laser pulses, such as the pulse energy and pulse repetition rate of the laser pulses. More specifically, laser system 102 includes a laser 202, a plurality of pulse stretchers 204, a feedback module 206, and a lens assembly 208. Laser 202, plurality of pulse stretchers 204, feedback module 206, and lens assembly 208 can be positioned proximate to each other. For instance, laser 202, plurality of pulse stretchers 204, feedback module 206, and lens assembly 208 can be rigidly mounted to a base such that laser pulses can travel from laser 202 to plurality of pulse stretchers 204, feedback module 206, and lens assembly 208.

Laser 202 is configured to provide laser pulses. For instance, laser 202 can be an excimer laser or a neodymium glass laser. The pulse width of the laser pulses can vary from a few nanoseconds to as large as 30 nanoseconds, depending on the desired configuration. Similarly, the pulse energy of the laser pulses can range from tenths of a joule to tens of joules. In one example, the pulse width of the laser pulses can be ten nanoseconds and the pulse energy of the laser pulses can be 50 joules. In another example, the pulse width of the laser pulses can be 15 nanoseconds and the pulse energy of the laser pulses can be 25 joules. Higher pulse energies can be used when it is desired to inspect thicker workpieces.

Plurality of pulse stretchers 204 can include multiple pulse stretchers coupled together in series. For instance, plurality of pulse stretchers 204 can include two, three, five, ten, or more than ten pulse stretchers coupled together in series such that an output of a first pulse stretcher is provided as an input to a second pulse stretcher, an output of the second pulse stretcher is provided as input to a third pulse stretcher, and so forth.

Further, plurality of pulse stretchers 204 can be configured to stretch pulse widths of laser pulses output by laser 202. Plurality of pulse stretchers 204 can, for instance, be configured to stretch the pulse width of a laser pulse from ten nanoseconds to at least 100 nanoseconds. As described further below, one or more pulse stretchers of plurality of pulse stretchers 204 can include two beamsplitting elements and an optical ring cavity that are configured to split a received laser pulse into a plurality of overlapping laser pulses with different time delays, thereby lengthening a pulse width of the received laser pulse.

In addition, one or more pulse stretchers of plurality of pulse stretchers 204 can include an optical delay controller that can be adjusted in order to alter a time delay introduced by the pulse stretcher. The time delay can be on the order of a few picoseconds, for instance. The optical delay controller can adjust the time delay in response to a control signal received from feedback module 206. Adjusting the time delay can alter the shape of a laser pulse output by an individual pulse stretcher, which in turn can help to control a shape of the overall stretched laser pulse output by plurality of pulse stretchers.

Feedback module 206 can be configured to control a shape of the stretched laser pulse output by plurality of pulse stretchers 204. In some examples, it is useful to inspect a workpiece using a laser pulse that has a particular shape, such as a uniform or balanced energy distribution, in order to improve the accuracy or precision of the inspection. Feedback module 206 can include one or more pulse delay comparators 210 and a computing device 212. Each pulse delay comparator can be configured to compare a first laser pulse of the laser pulses to a corresponding first stretched laser pulse that has been stretched by the plurality of pulse stretchers. Computing device 212 can be configured to determine, based on a result of the comparing by the pulse delay comparator(s) 210, an adjustment to a pulse stretcher of plurality of pulse stretchers 204, and apply the adjustment to the pulse stretcher.

Computing device 212 can include a processor and a non-transitory computer-readable medium storing program instructions that are executable by processor to carry out any of the computing device functions described herein. Processor could be any type of processor, such as a microprocessor, digital signal processor, multicore processor, etc. Alternatively, computing device 212 could include a group of processors that are configured to execute the program instructions, or multiple groups of processors that are configured to execute respective program instructions.

Computing device 212 can take the form of a laptop computer, mobile computer, wearable computer, tablet computer, desktop computer, or other type of computing device.

As such, computing device 212 can include a display, an input device, and one or more communication ports through which computing device 212 is configured to communicate with other devices of feedback module 206 as well as other devices of inspection system 100 of FIG. 1.

Lens assembly 208 can be configured to direct a stretched laser pulse output by plurality of pulse stretchers 204 to a workpiece. As such, lens assembly can include one or more optical lenses configured to focus and/or disperse the stretched laser pulse output by plurality of pulse stretchers 204.

Detector 104, in turn, can be configured to detect a response of the workpiece to the laser pulses. Detector 104 can take different forms, depending on the desired implementation. For instance, inspection system 100 can be a laser bond inspection system, and detector 104 can be a surface motion sensor operable to detect surface motion of the workpiece. One example of a surface motion sensor is an electromagnetic acoustic transducer (EMAT). Another example of a surface motion sensor is a laser interferometer. Alternatively, inspection system 100 can be an ultrasonic inspection system, and detector 104 can be an ultrasonic sensor.

Positioning system 106 can include multiple rigid links connected by movable joints. The joints can be moved manually by an operator. Positioning system 106 can also include a robotic positioning system having a robotic manipulator and a control system configured to control the robotic manipulator. The robotic manipulator can include multiple rigid links connected by movable joints, and the control system can control the movable joints to vary the position and/or orientation of the robotic manipulator. The control system can include a computing device, with a processor and memory storing instructions executable by the processor to generate outputs causing the robotic manipulator to move, for example.

End effector 108 can be an inspection head that is configured to direct laser pulses output by laser system 102 to the workpiece. End effector 108 can be coupled to an end of positioning system 106. End effector 108 can also include handles so that an operator can move a position of end effector 108 relative to a workpiece. Further, end effector 108 can be coupled to a robotic manipulator of positioning system 106. In this manner, a control system of positioning system 106 can adjust a positon of end effector 108, so as to adjust a position at which the laser pulses contact the workpiece.

Figure 2:
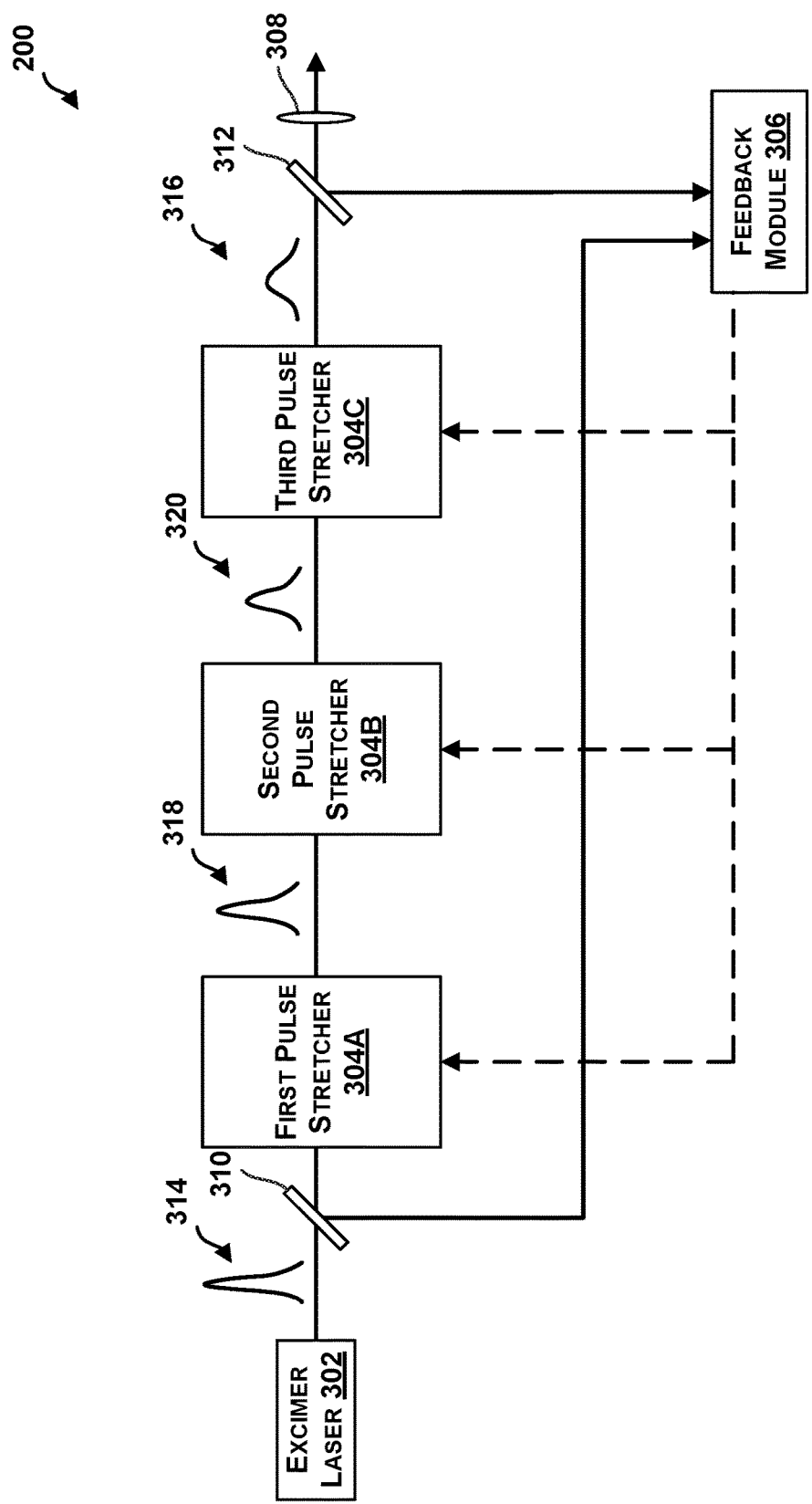
FIG. 2 is a conceptual illustration of a laser system, according to an example.

FIG. 2 is a conceptual illustration 200 of laser system 102 of FIG. 1, according to an example. Conceptual illustration 200 shows laser system 102 as including excimer laser 302, first pulse stretcher 304a, second pulse stretcher 304b, third pulse stretcher 304c, feedback module 306, and lens assembly 308. In addition, conceptual illustration shows an input beamsplitter 310 and an output beamsplitter 312.

In operation, excimer laser 302 can output a first laser pulse 314. Input beamsplitter 310 can then provide a sample of first laser pulse 314 to feedback module 306 before first laser pulse 314 enters first pulse stretcher 304a. For instance, input beamsplitter 310 can provide a sample of first laser pulse 314 to a pulse delay comparator of feedback module 306.

Further, first pulse stretcher 304a, second pulse stretcher 304b, and third pulse stretcher 304 can then stretch a pulse width of first laser pulse 314, yielding a first stretched laser pulse 316. More specifically, first pulse stretcher 304a can stretch a pulse width of first laser pulse 314 and output a stretched laser pulse 318. Second pulse stretcher 304b can then stretch a pulse width of stretched laser pulse 318 and output a stretched laser pulse 320. Still further, third pulse stretcher 304c can the stretch a pulse width of stretched laser pulse 320, yielding first stretched laser pulse 316.

Output beamsplitter 312 can then provide a sample of first stretched laser pulse 316 to feedback module 306. For instance, output beamsplitter 312 can provide a sample of first stretched laser pulse 316 to a pulse delay comparator of feedback module 306 for comparison with the sample of first laser pulse 314.

Figure 3:
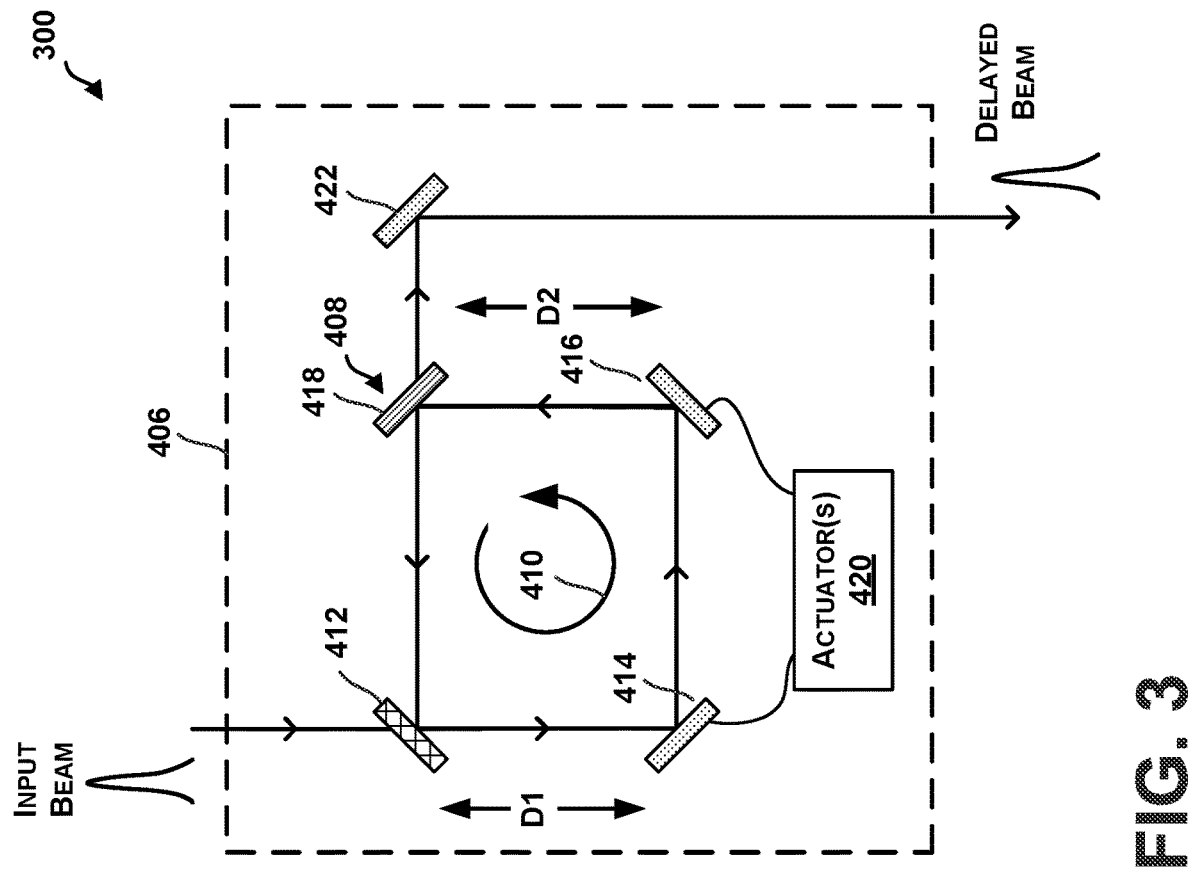
FIG. 3 illustrates a pulse stretcher, according to an example.
Figure 3:
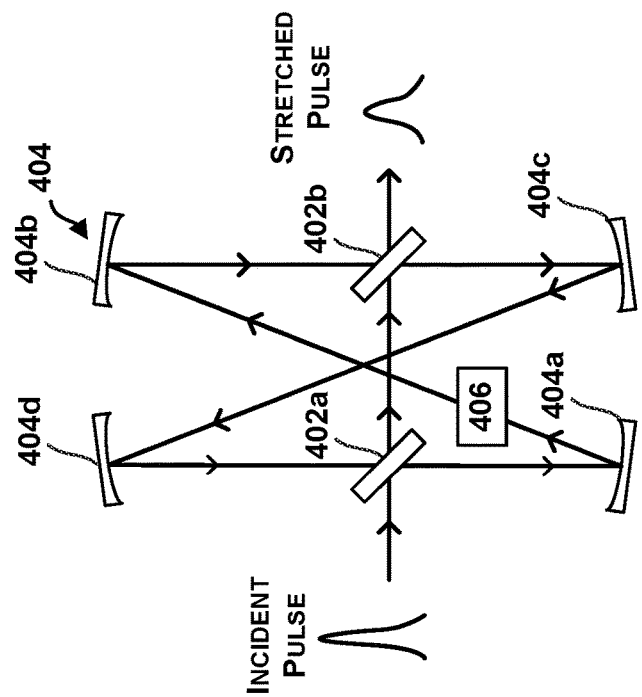

FIG. 3 illustrates a pulse stretcher 300, according to an example. Pulse stretcher 300 can be one of the pulse stretchers of plurality of pulse stretchers 204 of FIG. 1. As shown in FIG. 3, pulse stretcher 300 includes a first beamsplitting element 402a, a second beamsplitting element 402b, an optical ring cavity 404, and an optical delay controller 406.

First and second beamsplitting elements 402a, 402b and optical ring cavity 404 are configured to split received laser pulses into a plurality of laser pulses with different time delays. In this manner, when the laser pulses overlap, a stretched laser pulse forms. Optical ring cavity 404 includes first reflective mirror 404a, second reflective mirror 404b, third reflective mirror 404c, and fourth reflective mirror 404d. When an incident laser pulse enters pulse stretcher 400, beamsplitting element 402a is configured to split the incident laser pulse into a first beam and a second beam. The first beam enters optical ring cavity 404, where the first beam reflects off first reflective mirror 404a, travels through optical delay controller 406, and is then reflected by second reflective mirror 404b onto second beamsplitting element 402b. Optical ring cavity 404 and optical delay controller 406 therefore introduce a time delay to the first beam.

Second beamsplitting element 402b further splits both the second beam and the delayed first beam into two beams; one beam is directly output and the other beam enters optical ring cavity 404 again. The beam that enters optical ring cavity 404 reflects off third reflective mirror 404c and fourth reflective mirror 404d and then is incident on first beamsplitting element 402a to be split further.

The beamsplitting by first and second beamsplitting elements 402a, 402b can be repeated, which causes the incident laser pulse to be split into a plurality of laser pulses with different time delays. During the beamsplitting, pulse stretcher 400 can sequentially release the laser pulses of the plurality of laser pulses, so that the laser pulses form a stretched laser pulse having a longer pulse width than the incident laser pulse. Hence, pulse stretcher 400 can output a stretched laser pulse having a longer pulse width than the incident laser pulse.

Optical delay controller 406 includes a plurality of reflective surfaces 408 establishing a closed optical loop 410. Plurality of reflective surfaces 408 includes a one-sided mirror 412, a first mirror 414, a second mirror 416, and a Brewster window 418. Plurality of reflective surfaces 408 establish a path in which an input beam can repeatedly traverse to increase a path length that the input beam travels.

To enter closed optical loop 410, the input beam passes through a non-reflective surface of one-sided mirror 412. That is, one-sided mirror 412 is an input interface which permits optical signals received by optical delay controller 406 to enter into closed optical loop 410. One-sided mirror 412 is fabricated such that input beams can pass through the material of one-sided mirror 412 while signals received from the direction of Brewster window 418 are reflected towards first mirror 414. Once the input beam enters closed optical loop 410 by way of one-sided mirror 412, the input beam is reflected by first mirror 414 towards second mirror 416 which in turn reflects the input beam towards Brewster window 418. Unlike one-sided mirror 412, first mirror 414 and second mirror 416 are not designed to allow input beams to pass through.

Brewster window 418 can be tilted at a Brewster's angle relative to the incident direction of the optical pulse on Brewster window 418. A Brewster's angle is an angle of incidence at which light with a particular polarization is transmitted through a transparent surface with no reflection. Brewster window 418 is an output interface that permits some of the pulse or laser beam to leave closed optical loop 410. For instance, Brewster window 418 can permit a portion of the pulse in closed optical loop 410 that has achieved a desired delay to exit closed optical loop 410. However, Brewster window 418 is only one example of a selective optical component that enables optical signals to exit closed optical loop 410 and is not meant to be limiting. Other optical components that permit optical signals to exit closed optical loop 410 after achieving a threshold intensity or a particular polarization can also be used.

Optical delay controller 406 can maintain a separation distance between at least two reflective surfaces of plurality of reflective surfaces 408 to ensure optical signals exiting closed optical loop 410 have a desired delay. To do so, optical delay controller 406 includes one or more actuators 420 for adjusting positions of reflective surfaces of plurality of reflective surfaces 408 relative to each other. In the example shown in FIG. 4, actuators 420 can alter a separation distance D1 between one-sided mirror 412 and first mirror 414 as well as a separation distance D2 between second mirror 416 and Brewster window 418. One of actuators 420 can be mechanically coupled to first mirror 414 and configured to move first mirror 414 so as to increase or decrease separation distance D1. Increasing the separation distance D1 can increase the time delay introduced by optical delay controller 406. Similarly, decreasing the separation distance D1 can decrease the time delay introduced by optical delay controller 406. Increasing or decreasing the time delay can, in turn, change the shape of the laser pulse output by pulse stretcher 400. It can be desirable to create a laser pulse having a uniform or balanced energy distribution, to enable better inspection. The same or a different one of actuators 420 can be mechanically coupled to second mirror 416 to increase or decrease separation distance D2 in a similar manner.

Additionally or alternatively, one or more of actuators can be configured to increase or decrease a separation distance between one-sided mirror 412 and Brewster window 418 as well as increase or decrease a separation distance between first mirror 414 and second mirror 416 to enable more control over the path length that optical signals travel.

In FIG. 3, the shape of closed optical loop 410 is rectangular. In other examples, closed optical loop 410 may have other shapes, such as a pentagonal shape or hexagonal shape.

After exiting closed optical loop 410, the delayed beam can reflect off third mirror 422 and be directed toward second reflective mirror 404b, so that the delay beam is inserted back into optical ring cavity 404. Hence, optical delay controller 406 can receive an input beam, add a time delay to the input beam, and output a delayed beam.

In FIG. 3, optical delay controller 406 is shown positioned between first reflective mirror 404a and second reflective mirror 404b. In other examples, optical delay controller 406 can be positioned in other positions, such as between beamsplitting element 402a and first reflective mirror 404a, between second reflective mirror 404b and second beamsplitting element 402b, between second beamsplitting element 402b and third reflective mirror 404c, between third reflective mirror 404c and fourth reflective mirror 404d, or between fourth reflective mirror 404d and first beamsplitting element 402a. Different pulse stretchers of plurality of pulse stretchers 204 could have optical delay controllers positioned in different respective positions, so that each pulse stretcher alters the shape of a received laser pulse in a slightly different manner. This can enable more precise control over the overall shape of the stretched laser pulse output by plurality of pulse stretchers 204.

Figure 4:
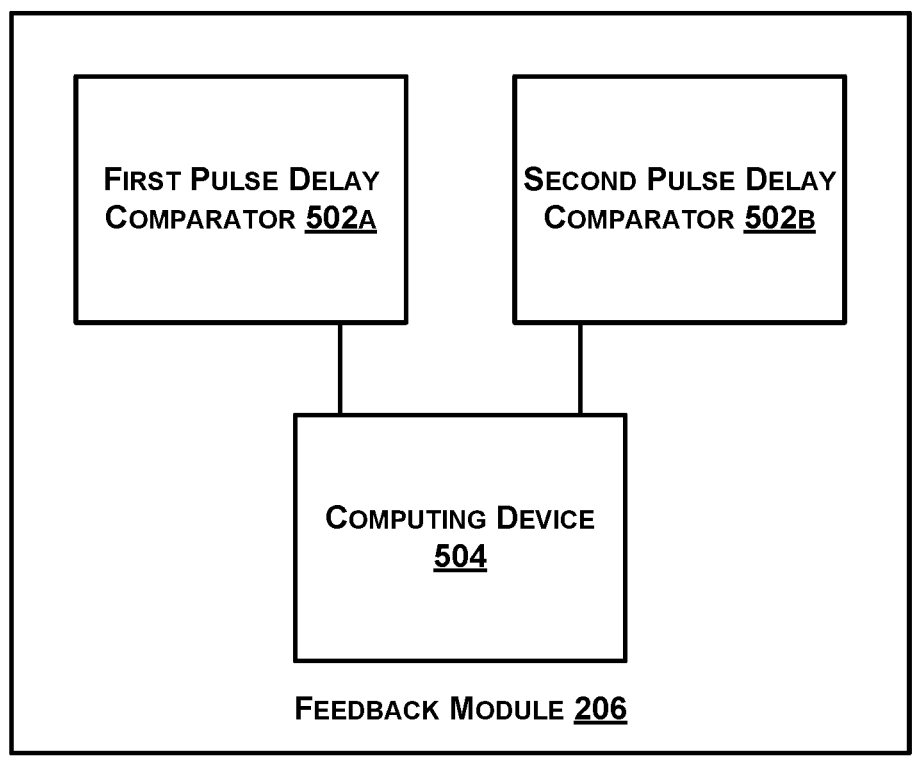
FIG. 4 illustrates a feedback module, according to an example.

FIG. 4 illustrates components of feedback module 206 of FIG. 2, according to an example. As shown in FIG. 4, feedback module 206 includes a first pulse delay comparator 502a, second pulse delay comparator 502b, and computing device 504. First pulse delay comparator 502a and second pulse delay comparator 502b can be in wired or wireless communication with computing device 504 by way of one or more wired or wireless communication links.

In line with the discussion above, first pulse delay comparator 502a can be configured to compare a first laser pulse to a corresponding first stretched laser pulse. For instance, first pulse delay comparator 502a can be configured to compare a sample of first laser pulse 314 of FIG. 2 to a sample of first stretched laser pulse 316 of FIG. 2.

Comparing two laser pulses can involve comparing leading edges of the two laser pulses or comparing trailing edges of the two laser pulses. For example, a comparison of a first laser pulse and a second laser pulse can provide an indication of a time difference between a position of a leading edge of the first laser pulse and a leading edge of the second laser pulse. As another example, a comparison of a first laser pulse and a second laser pulse can provide an indication of a time difference between a position of a trailing edge of the first laser pulse and a trailing edge of the second laser pulse. These time differences can be used by computing device 504 to determine an adjustment to a pulse stretcher. Additionally or alternatively, a comparison of a first laser pulse and a second laser pulse can provide an indication of an amplitude difference between a leading edge of the first laser pulse and a leading edge of the second laser pulse, or an amplitude difference between a trailing edge of the first laser pulse and a trailing edge of the second laser pulse. These altitude differences can also be used by computing device 504 to determine an adjustment to a pulse stretcher.

Similarly, second pulse delay comparator 502b can be configured to compare a first laser pulse to a corresponding first stretched laser pulse. For instance, second pulse delay comparator 502b can be configured to compare a sample of first laser pulse 314 of FIG. 3 to a sample of first stretched laser pulse 316 of FIG. 2. Second pulse delay comparator 502b, however, can be configured to perform a different comparison than first pulse delay comparator 502a. For instance, first pulse delay comparator 502a can be configured to compare a trailing edge of a first laser pulse and a trailing edge of a corresponding first stretched laser pulse, and second pulse delay comparator 502b can be configured to compare a leading edge of the first laser pulse and a leading edge of the corresponding first stretched laser pulse.

Each of first pulse delay comparator 502a and second pulse delay comparator 502b can include a detector configured to detect an optical signal, an analog-to-digital converter, and comparison hardware and/or software. The detector can be an optical sensor that converts incident light into an electrical signal. This can enable the comparison hardware to digitally compare two pulses. The comparison hardware and/or software can include a comparator, such as transistor-transistor logic (TTL) comparator. The comparison hardware and/or software can also include a graphical programming application that facilitates visualization of characteristics of an optical signal, such as LabVIEW provided by National Instruments of Austin, Texas.

Computing device 504 can be configured to determine, based on a result of a comparison by a pulse delay comparator, an adjustment to a pulse stretcher, and apply the adjustment to the pulse stretcher. For instance, computing device 504 can be configured to determine, based on a result of a comparison by first pulse delay comparator 502a, an adjustment to a first pulse stretcher, and apply the adjustment to the first pulse stretcher. In addition, computing device 504 can be configured to determine, based on a result of a comparison by second pulse delay comparator 502b, an adjustment to a second pulse stretcher, and apply the adjustment to the second pulse stretcher.

A result of a comparison by a pulse delay comparator can include a time difference. Computing device 504 could be configured to make a first adjustment if the time difference is greater than a threshold, but to make a second adjustment if the time difference is less than or equal to the threshold. Similarly, a result of a comparison by a pulse delay comparator can include an amplitude difference. Computing device 504 could be configured to make a first adjustment if the amplitude difference is greater than a threshold, but to make a second adjustment if the amplitude difference is less than or equal to the threshold. The first adjustment could be designed to decrease the amplitude different, and the second adjustment could be designed to increase the amplitude difference.

The first adjustment and the second adjustment can include an increase or a decrease to a time delay introduced by a pulse stretcher. For instance, computing device 504 can be configured to cause an actuator of an optical delay controller of a pulse stretcher to adjust a separation distance between at least two reflective surfaces of a plurality of reflective surfaces of the optical delay controller. Computing device 504 can cause the actuator to adjust the separation distance by sending a control signal to the actuator or to a control system of the optical delay controller. Adjusting the separation distance can modify the shape of subsequent laser pulses that are stretched by the pulse stretcher.

Figure 5:
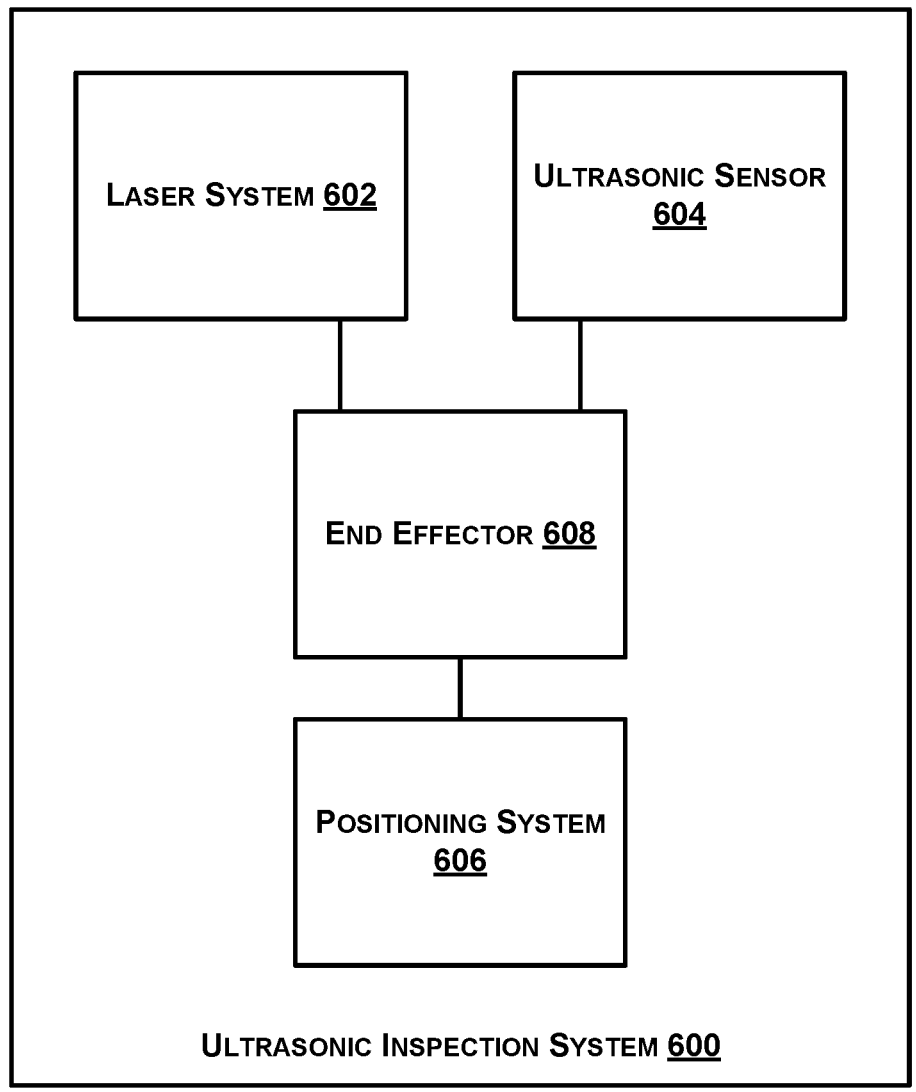
FIG. 5 illustrates an ultrasonic inspection system, according to an example.

FIG. 5 illustrates an ultrasonic inspection system 600, according to an example. Ultrasonic inspection system 600 represents an example implementation of inspection system 100 of FIG. 1. As shown in FIG. 5, like inspection system 100 of FIG. 1, ultrasonic inspection system 600 includes a laser system 602, a positioning system 606, and an end effector 608. Further, ultrasonic inspection system 600 includes an ultrasonic sensor 604.

Laser system 602 and/or ultrasonic sensor 604 can be positioned within end effector 608. Laser system 602 and ultrasonic sensor 604 can also be in wired or wireless communication with each other by way of one or more communication links or in wired or wireless communication with a central computing device. Laser system 602, ultrasonic sensor 604, positioning system 606, and end effector 608 can be components of a common apparatus. The apparatus may be a portable apparatus.

Ultrasonic sensor 604 can be configured to detect a response of a workpiece to a laser pulse or laser pulses provided to the workpiece by laser system 602. For instance, ultrasonic sensor 604 can be an ultrasonic transducer configured to detect ultrasonic waves.

Figure 6:
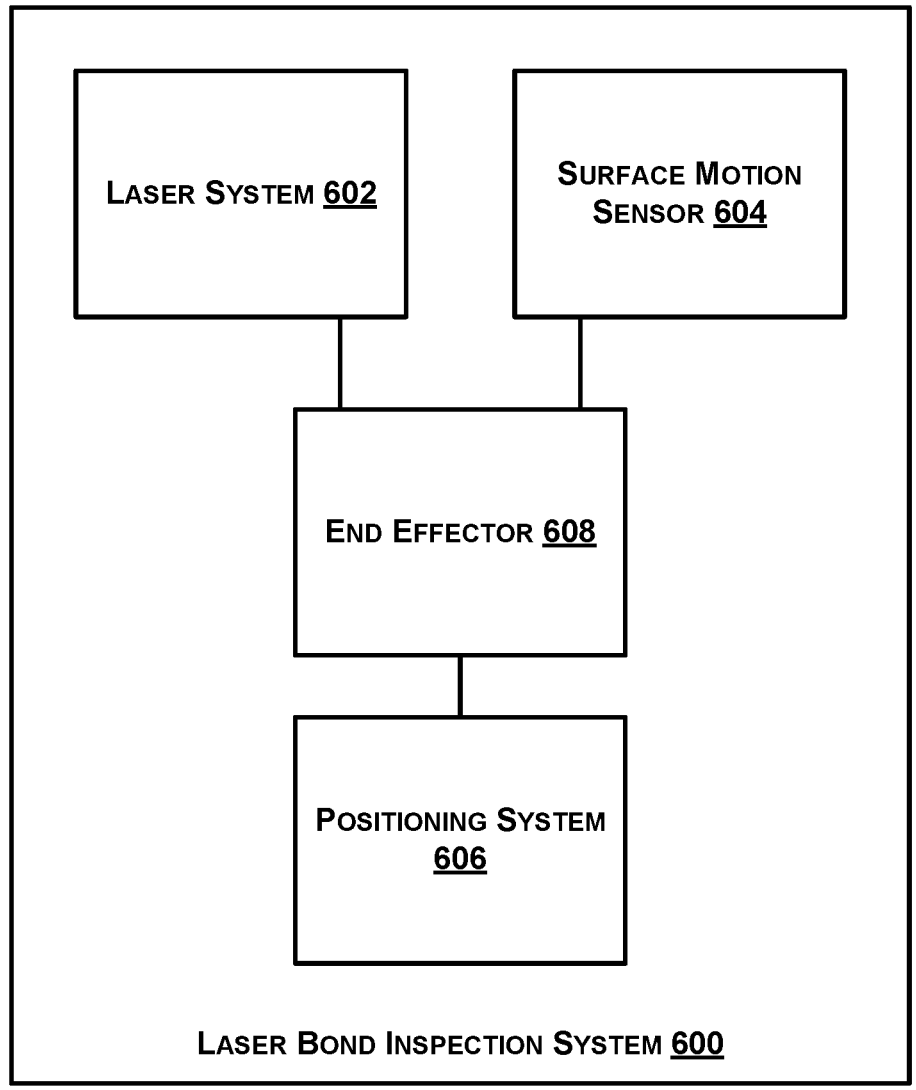
FIG. 6 illustrates a laser bond inspection system, according to an example.
Figure 7:
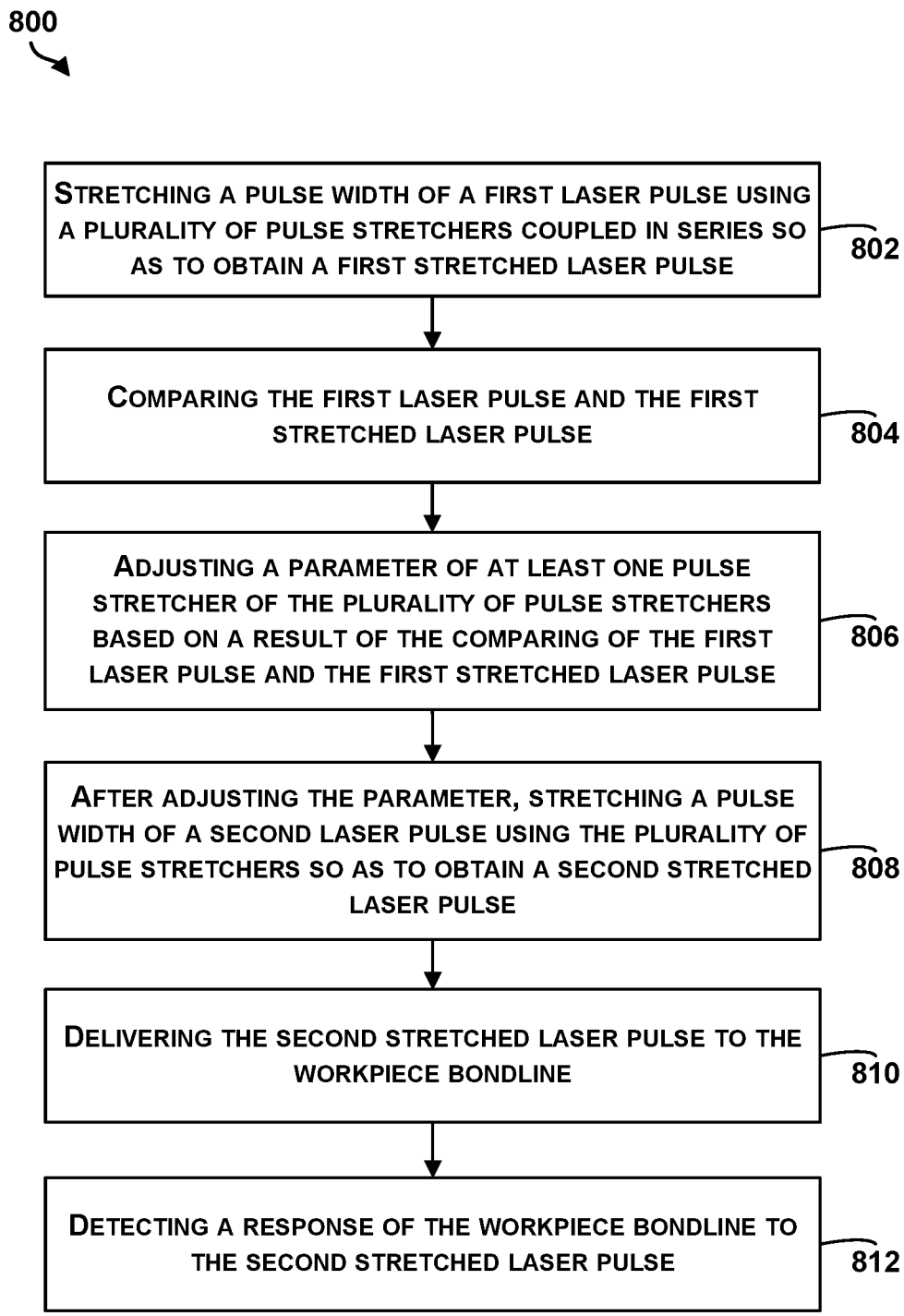
FIG. 7 shows a flowchart of a method, according to an example.

FIG. 6 illustrates a laser bond inspection system 700, according to an example. Laser bond inspection system 700 represents an example implementation of inspection system 100 of FIG. 1. As shown in FIG. 7, like inspection system 100 of FIG. 1, laser bond inspection system 700 includes a laser system 702, a positioning system 706, and an end effector 708. Further, laser bond inspection system 700 includes a surface motion sensor 704.

Laser system 702 and/or surface motion sensor 704 can be positioned within end effector 708. Laser system 702 and surface motion sensor 704 can also be in wired or wireless communication with each other by way of one or more communication links or in wired or wireless communication with a central computing device. Laser system 702, surface motion sensor 704, positioning system 706, and end effector 708 can be components of a common apparatus. The apparatus may be a portable apparatus.

Surface motion sensor 704 can be configured to detect a response of a workpiece to a laser pulse provided to the workpiece by laser system 702. For instance, surface motion sensor 704 can be configured to detect surface motion on a surface of the workpiece, with the surface motion being indicative of a failure of an adhesive bond. Surface motion sensor can, for example, include a laser interferometer or an EMAT.

FIG. 7 shows a flowchart of a method 800, according to an example. Method 800 shown in FIG. 7 presents an embodiment of a method that, for example, could be used with one of the systems shown in FIGS. 1, 5, and 6, for example, or any of the systems disclosed herein. Any of the example devices or systems described herein, such as components of inspection system 100, may be used or configured to perform logical functions presented in FIG. 7.

Method 800 can include one or more operations, functions, or actions as illustrated by one or more of blocks 802-812. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 802, the method 800 includes stretching a pulse width of a first laser pulse using a plurality of pulse stretchers coupled in series so as to obtain a first stretched laser pulse. For instance, a first pulse stretcher of the plurality of pulse stretchers can receive a laser pulse output by a laser, and output a stretched laser pulse. A second pulse stretcher of the plurality of pulse stretchers can then receive and further stretch the stretched laser pulse. This process can be repeated by each additional pulse stretcher in the plurality of pulse stretchers, until a final pulse stretcher of the plurality of pulse stretchers outputs a stretched laser pulse. Each pulse stretcher of the plurality of pulse stretchers can include two beamsplitting elements and an optical ring cavity that are configured to split laser pulses into a plurality of laser pulses with different time delays. Further, one or more pulse stretchers of the plurality of pulse stretchers can include an optical delay controller, such as optical delay controller 406 of FIG. 4.

At block 804, the method 800 includes comparing the first laser pulse and the first stretched laser pulse. Comparing the first laser pulse and the first stretched laser pulse can involve comparing leading edges of the two laser pulses or comparing trailing edges of the two laser pulses using a pulse delay comparator. For example, a comparison of the first laser pulse and the first stretched laser pulse can provide an indication of a time difference between a position of a leading edge of the first laser pulse and a leading edge of the first stretched laser pulse. As another example, a comparison of the first laser pulse and the first stretched laser pulse can provide an indication of a time difference between a position of a trailing edge of the first laser pulse and a trailing edge of the first stretched laser pulse. Additionally or alternatively, a comparison of the first laser pulse and the first stretched laser pulse can provide an indication of an amplitude difference between a leading edge of the first laser pulse and a leading edge of the first stretched laser pulse, or an amplitude difference between a trailing edge of the first laser pulse and a trailing edge of the first stretched laser pulse.

Comparing the first laser pulse and the first stretched laser pulse can involve providing a sample of the first laser pulse to a pulse delay comparator using an input beamsplitter and providing a sample of the first stretched laser pulse to the pulse delay comparator using an output beamsplitter.

At block 806, the method 800 includes adjusting a parameter of at least one pulse stretcher of the plurality of pulse stretchers based on a result of the comparing of the first laser pulse and the first stretched laser pulse. By way of example, a computing device, such as computing device 506 of FIG. 5, can determine, based on the result of the comparing, an adjustment to at least one pulse stretcher of the plurality of pulse stretchers, and apply the adjustment to the at least one pulse stretcher. The parameter could be a time delay introduced by an optical delay controller of the at least one pulse stretcher, for instance.

At block 808, the method 800 includes, after adjusting the parameter, stretching a pulse width of a second laser pulse using the plurality of pulse stretchers so as to obtain a second stretched laser pulse. For instance, a first pulse stretcher of the plurality of pulse stretchers can receive the second laser pulse, stretch the second laser pulse, and output a stretched laser pulse. A second pulse stretcher of the plurality of pulse stretchers can receive the stretched laser pulse output by the first pulse stretcher, further stretched the stretched laser pulse, and output a stretched laser pulse to the next pulse stretcher in the plurality of pulse stretcher. This process can continue until a final pulse stretcher of the plurality of pulse stretchers outputs a stretched laser pulse.

At block 810, the method 800 includes delivering the second stretched laser pulse to the workpiece bondline. For instance, the second stretched laser pulse can be output through a lens assembly. Delivering the second stretched laser pulse to the workpiece bondline can involve causing the second stretched laser pulse to pass through a transparent overlay provided on the workpiece.

At block 812, the method 800 includes detecting a response of the workpiece bondline to the second stretched laser pulse. For instance, a detector, such as surface motion sensor 704 of FIG. 6, can detect surface motion on a surface of the workpiece, with the surface motion being indicative of a failure of an adhesive bond at the workpiece bondline.

Figure 8:
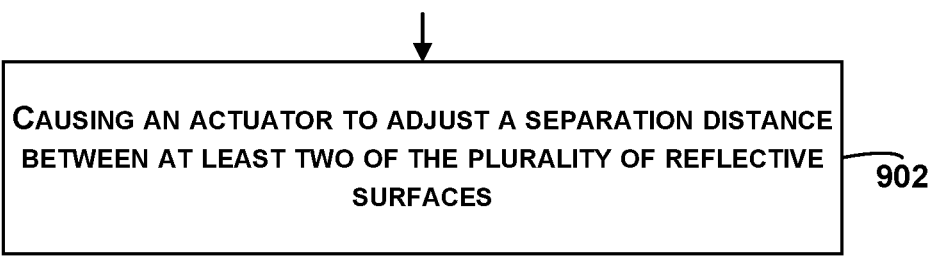
FIG. 8 shows an additional operation for use with the method shown in FIG. 7.

FIG. 8 shows an additional operation for use with the method shown in FIG. 7. Block 902 of FIG. 8 could be performed as part of block 806 of FIG. 7. For instance, block 902 of FIG. 8 could be performed in an example in which the at least one pulse stretcher includes an optical delay controller having a plurality of reflective surfaces establishing a closed optical loop.

At block 902, FIG. 8 includes causing an actuator to adjust a separation distance between at least two of the plurality of reflective surfaces. For instance, a computing device, such as computing device 504 of FIG. 4, could cause actuator 420 of FIG. 3 to adjust a separation distance between one-sided mirror 412 and first mirror 414 of FIG. 3. Alternatively, computing device 504 could cause actuator 420 of FIG. 3 to adjust a separation distance between second mirror 416 and Brewster window 418 of FIG. 3.

Figure 9:
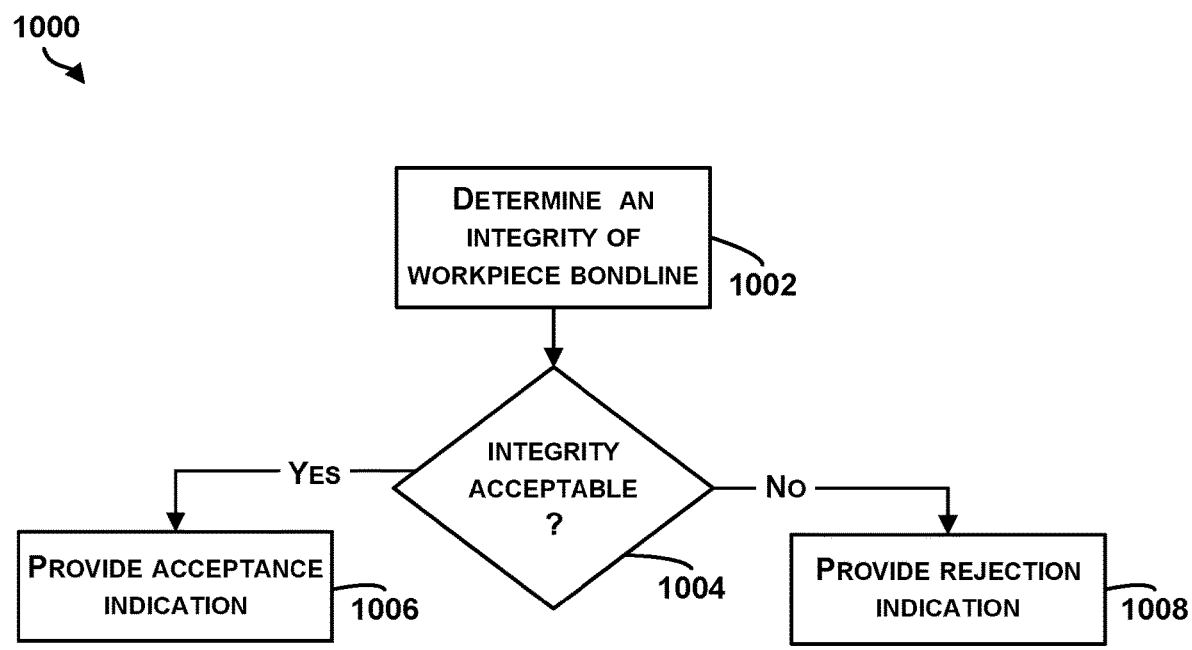
FIG. 9 shows a flowchart of another method, according to an example.

FIG. 9 shows a flowchart of another method 1000, according to an example. Method 1000 shown in FIG. 9 presents an example of a method that, for example, could be used with one of the systems shown in FIGS. 1, 5, and 6, for example, or any of the systems disclosed herein. Any of the example devices or systems described herein, such as components of inspection system 100 of FIG. 1, may be used or configured to perform logical functions presented in FIG. 9. Method 1000 may include one or more operations, functions, or actions as illustrated by one or more of blocks 1002-1008. Although these blocks are illustrated in a sequential order, these blocks may also be performed in parallel, and/or in a different order than those described herein. Also, the various blocks may be combined into fewer blocks, divided into additional blocks, and/or removed based upon the desired implementation. Each block may represent a module, segment, or a portion of program code, which includes one or more instructions executable by a processor for implementing specific logical functions or steps in the process.

Method 1000 could be combined with one or more blocks of method 800 of FIG. 8.

Initially, at block 1002, the method 1000 includes determining an integrity of a workpiece bondline. Determining the integrity of the workpiece bondline can involve determining an amount of surface motion on a surface of the workpiece using a surface motion sensor. At block 1004, the method 1000 includes determining whether or not the integrity of the workpiece bondline is acceptable. For instance, determining whether or not the integrity of the workpiece bondline is acceptable can involve determining whether or not an amount of surface motion exceeds a threshold. If the amount of surface motion exceeds the threshold, the integrity of the workpiece bondline can be deemed not acceptable. Whereas, if the amount of surface motion does not exceed the threshold, the integrity of the workpiece bondline can be deemed acceptable.

If the workpiece bondline is acceptable, then, at block 1006, an acceptance indication may be provided. For instance, an inspection system may cause an audio element (e.g., a speaker or a buzzer) to provide an audible acceptance indication and/or cause a lighting element (e.g., a light-emitting diode or a display) to provide a visual acceptance indication. Whereas, if the integrity of the workpiece bondline is not acceptable, then, at block 1008, a rejection indication may be provided. Like the acceptance indication, the rejection indication may be an audible indication or a visual indication.

The providing of the acceptance indication may be optional. For instance, a control system may be configured to not provide any indication if the integrity of the workpiece bondline is acceptable, but to provide a rejection indication if the integrity of the workpiece bondline is not acceptable.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. An inspection system comprising:
    a laser system comprising:
        a laser configured to provide a laser pulse,
        a plurality of pulse stretchers coupled together in series, the plurality of pulse stretchers configured to stretch a pulse width of the laser pulse so as to obtain a stretched laser pulse, wherein one or more pulse stretchers of the plurality of pulse stretchers includes two beamsplitting elements and an optical ring cavity that are configured to split a received laser pulse into a plurality of overlapping laser pulses with different time delays, thereby lengthening a pulse width of the received laser pulse, wherein the two beamsplitting elements include (i) a first beamsplitting element that splits the received laser pulse into a first beam that enters the optical ring cavity for generating a delayed first beam and a second beam and (ii) a second beamsplitting element that splits the second beam and the delayed first beam into two beams where one beam is output as the stretched laser pulse and the other enters the optical ring cavity, wherein the one or more pulse stretchers of the plurality of pulse stretchers includes an optical delay controller through which the first beam travels during generation of the delayed first beam, wherein the optical delay controller includes a plurality of reflective surfaces establishing a closed optical loop and an actuator to adjust a separation distance between at least two of the plurality of reflective surfaces so as to adjust the time delay of the first beam, wherein one of the plurality of reflective surfaces permits a portion of the first beam that has achieved a desired delay to exit the closed optical loop; and
        a lens assembly configured to direct the stretched laser pulse to a workpiece bondline;
    a feedback module configured to control a shape of the stretched laser pulse output by the plurality of pulse stretchers, wherein the feedback module includes one or more pulse delay comparators and a computing device, each pulse delay comparator configured to compare the received laser pulse to a corresponding stretched laser pulse that has been stretched by the plurality of pulse stretchers, and the computing device is configured to output a control signal to the optical delay module, based on a result of the comparing by the one or more pulse delay comparators, indicating an adjustment to the time delay; and a detector configured to detect a response of the workpiece bondline to the stretched laser pulse.

2. The inspection system of claim 1, wherein the laser system further comprises a computing device configured to determine an adjustment to a time delay introduced by a pulse stretcher of the plurality of pulse stretchers.

3. The inspection system of claim 1, wherein the inspection system is configured to:
determine, based on the response, an integrity of the workpiece bondline; and
provide an indication of the integrity of the workpiece bondline.

4. The inspection system of claim 3, further comprising an audio element configured to provide the indication.

5. The inspection system of claim 3, further comprising a lighting element configured to provide the indication.

6. The inspection system of claim 3, wherein:
the response is an amount of surface motion, and
determining the integrity of the workpiece bondline comprises determining whether the amount of surface motion exceeds a threshold.

7. The inspection system of claim 1, wherein the stretched laser pulse has a pulse width of at least 100 nanoseconds and a pulse energy of at least 5 Joules.

8. An inspection system comprising:
an end effector;
a positioning system configured to adjust a position of the end effector;
a laser system provided within the end effector, the laser system comprising:
a laser configured to provide a laser pulse,
a plurality of pulse stretchers coupled together in series, the plurality of pulse stretchers configured to stretch a pulse width of the laser pulse so as to obtain a stretched laser pulse, wherein one or more pulse stretchers of the plurality of pulse stretchers includes two beamsplitting elements and an optical ring cavity that are configured to split a received laser pulse into a plurality of overlapping laser pulses with different time delays, thereby lengthening a pulse width of the received laser pulse, wherein the two beamsplitting elements include (i) a first beamsplitting element that splits the received laser pulse into a first beam that enters the optical ring cavity for generating a delayed first beam and a second beam and (ii) a second beamsplitting element that splits the second beam and the delayed first beam into two beams where one beam is output as the stretched laser pulse and the other enters the optical ring cavity, wherein the one or more pulse stretchers of the plurality of pulse stretchers includes an optical delay controller through which the first beam travels during generation of the delayed first beam, wherein the optical delay controller includes a plurality of reflective surfaces establishing a closed optical loop and an actuator to adjust a separation distance between at least two of the plurality of reflective surfaces so as to adjust the time delay of the first beam, wherein one of the plurality of reflective surfaces permits a portion of the first beam that has achieved a desired delay to exit the closed optical loop; and
a lens assembly configured to direct the stretched laser pulse to a workpiece bondline;

a feedback module configured to control a shape of the stretched laser pulse output by the plurality of pulse stretchers, wherein the feedback module includes one or more pulse delay comparators and a computing device, each pulse delay comparator configured to compare the received laser pulse to a corresponding stretched laser pulse that has been stretched by the plurality of pulse stretchers, and the computing device is configured to output a control signal to the optical delay module, based on a result of the comparing by the one or more pulse delay comparators, indicating an adjustment to the time delay; and a detector configured to detect a response of the workpiece bondline to the stretched laser pulse.

9. The inspection system of claim 8, wherein the inspection system is a portable inspection system.

10. The inspection system of claim 8, wherein the end effector is coupled to an end of the positioning system.

11. The inspection system of claim 8, wherein the end effector is coupled to a robotic manipulator of the positioning system.

12. The inspection system of claim 8, wherein the end effector is an inspection head.

13. The inspection system of claim 8, wherein the stretched laser pulse has a pulse width of at least 100 nanoseconds and a pulse energy of at least 5 Joules.

14. The inspection system of claim 13, wherein the laser pulse has a pulse width of less than 20 nanoseconds.

15. The inspection system of claim 8, wherein the detector comprises an ultrasonic sensor.

16. The inspection system of claim 8, wherein the detector comprises a surface motion sensor.

17. The inspection system of claim 8, wherein the inspection system is configured to:
determine, based on the response, an integrity of the workpiece bondline; and
provide an indication of the integrity of the workpiece bondline.

18. The inspection system of claim 17, wherein:
the response is an amount of surface motion, and
determining the integrity of the workpiece bondline comprises determining whether the amount of surface motion exceeds a threshold.

19. A method for inspecting a workpiece bondline comprising:
adjusting a position of an end effector so as to adjust a position at which laser pulses output by a laser system contact a workpiece, wherein the laser system is provided within the end effector;
providing a laser pulse using the laser system;
stretching a pulse width of the laser pulse using a plurality of pulse stretchers coupled in series so as to obtain a stretched laser pulse, wherein the plurality of pulse stretchers are provided within the end effector, wherein one or more pulse stretchers of the plurality of pulse stretchers includes two beamsplitting elements and an optical ring cavity that are configured to split a received laser pulse into a plurality of overlapping laser pulses with different time delays, thereby lengthening a pulse width of the received laser pulse, wherein the two beamsplitting elements include (i) a first beamsplitting element that splits the received laser pulse into a first beam that enters the optical ring cavity for generating a delayed first beam and a second beam and (ii) a second beamsplitting element that splits the second beam and the delayed first beam into two beams where one beam is output as the stretched laser pulse and the other enters the optical ring cavity, wherein the one or more pulse stretchers of the plurality of pulse stretchers includes an optical delay controller through which the first beam travels during generation of the delayed first beam, wherein the optical delay controller includes a plurality of reflective surfaces establishing a closed optical loop and an actuator to adjust a separation distance between at least two of the plurality of reflective surfaces so as to adjust the time delay of the first beam, wherein one of the plurality of reflective surfaces permits a portion of the first beam that has achieved a desired delay to exit the closed optical loop;

controlling a shape of the stretched laser pulse output by the plurality of pulse stretchers, by a feedback module including one or more pulse delay comparators and a computing device, each pulse delay comparator configured to compare the received laser pulse to a corresponding stretched laser pulse that has been stretched by the plurality of pulse stretchers, and the computing device is configured to output a control signal to the optical delay module, based on a result of the comparing by the one or more pulse delay comparators, indicating an adjustment to the time delay; and delivering the stretched laser pulse to a workpiece bondline; and detecting a response of the workpiece bondline to the stretched laser pulse.

20. The method of claim 19, further comprising:

determining, based on the response, an integrity of the workpiece bondline; and providing an indication of the integrity of the workpiece bondline.

\* \* \* \* \*